United States Patent
Brennvall et al.

(10) Patent No.: US 11,159,079 B2
(45) Date of Patent: Oct. 26, 2021

(54) THREE PHASED BALANCED OR UNBALANCED ASYMMETRIC RELUCTANCE MOTOR

(75) Inventors: Jon Eirik Brennvall, Trondheim (NO); Terje Søras, Vannvikan (NO); Asle Hagen, Vannvikan (NO); Lars Erling Stensen, Oslo (NO); Tor Erik Naebb, Leksvik (NO); Agnar AA, Rissa (NO)

(73) Assignees: ELTORQUE AS, Vanvikan (NO); GREENWAY AS, Trondheim (NO)

( * ) Notice: Subject to any disclaimer, the term of this patent is extended or adjusted under 35 U.S.C. 154(b) by 784 days.

(21) Appl. No.: 13/979,921

(22) PCT Filed: Feb. 2, 2012

(86) PCT No.: PCT/NO2012/050013
§ 371 (c)(1),
(2), (4) Date: Nov. 1, 2013

(87) PCT Pub. No.: WO2012/105849
PCT Pub. Date: Aug. 9, 2012

(65) Prior Publication Data
US 2014/0042837 A1   Feb. 13, 2014

(30) Foreign Application Priority Data
Feb. 3, 2011 (NO) .................. 20110191

(51) Int. Cl.
*H02K 37/04* (2006.01)
*H02K 26/00* (2006.01)

(52) U.S. Cl.
CPC ............. *H02K 37/04* (2013.01); *H02K 26/00* (2013.01); *H02K 2213/03* (2013.01)

(58) Field of Classification Search
CPC ..... H02K 26/00; H02K 37/04; H02K 2213/03
USPC ................................ 310/49.24, 49.37, 49.44
IPC ....................................................... H02K 37/04
See application file for complete search history.

(56) References Cited

U.S. PATENT DOCUMENTS

| | | | | |
|---|---|---|---|---|
| 2,627,040 A | * | 1/1953 | Siegfried | H02K 37/02 310/49.43 |
| 3,866,104 A | | 2/1975 | Heine | |
| 3,972,535 A | * | 8/1976 | Bleiman | G11B 19/28 310/49.44 |
| 4,712,028 A | * | 12/1987 | Horber | H02K 37/10 310/171 |

(Continued)

FOREIGN PATENT DOCUMENTS

| | | |
|---|---|---|
| CN | 1399399 A | 2/2003 |
| DE | 35 36 238 | 2/1987 |

(Continued)

OTHER PUBLICATIONS

International Preliminary Report on Patentability dated Feb. 13, 2013, issued in connection with International Application No. PCT/NO2012/050013.

(Continued)

*Primary Examiner* — John K Kim
(74) *Attorney, Agent, or Firm* — Foley & Lardner LLP

(57) ABSTRACT

This patent describes a three-phased reluctance motor (10) of stepper type with six coils placed in six slots (15¹-15⁶) in a stator (5), n*6 teeth (7) in rotor (5) where n is an integer equal to or larger than 3, typically 8-16 and were the teeth (18) in stator (4) are shifted unsymmetrical so the motor (10) can produce torque at every angle between rotor (5) and stator (4).

4 Claims, 2 Drawing Sheets

(56) References Cited

U.S. PATENT DOCUMENTS

| | | | | |
|---|---|---|---|---|
| 4,713,570 | A * | 12/1987 | Mastromattei | H02K 21/44 |
| | | | | 310/168 |
| 8,970,083 | B2 * | 3/2015 | Zhao | H02K 37/20 |
| | | | | 310/181 |
| 9,006,941 | B2 * | 4/2015 | Zhao | H02K 37/14 |
| | | | | 310/49.37 |
| 2002/0079750 | A1 | 6/2002 | Sakamoto et al. | |
| 2009/0091198 | A1 | 4/2009 | Husband et al. | |
| 2014/0042837 | A1 * | 2/2014 | Brennvall | H02K 26/00 |
| | | | | 310/49.44 |
| 2015/0349590 | A1 * | 12/2015 | Brennvall | H02K 1/165 |
| | | | | 310/49.43 |

FOREIGN PATENT DOCUMENTS

| | | |
|---|---|---|
| EP | 1 280 262 | 1/2003 |
| GB | 2 262 843 A | 6/1993 |

OTHER PUBLICATIONS

Notification of Receipt of Demand by Competent International Preliminary Examining Authority dated Dec. 21, 2012 in connection with International Application No. PCT/NO2012/050013.

Sargos et al., "Generalized Theory of the Structures of Reluctance Step Motors", Conference Record of the 1993 IEEE Industry Applications Society Annual Meeting, Oct. 1993, Toronto, Canada, vol. 1, pp. 211, 216.

Sargos et al., "Generalized Theory of the Structures of Reluctance Step Motors," IEEE, vol. 1, pp. 211-215, Dec. 1993.

\* cited by examiner

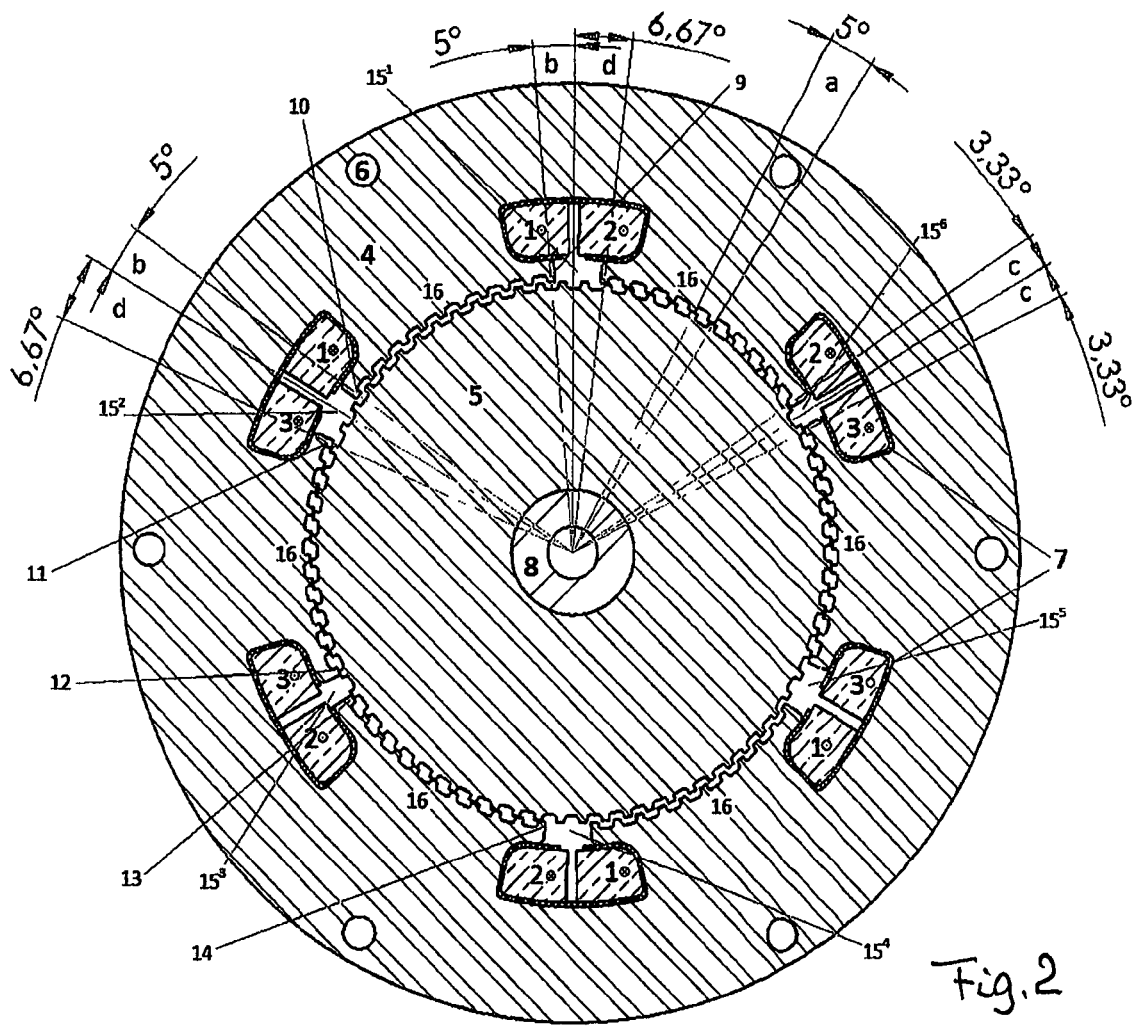
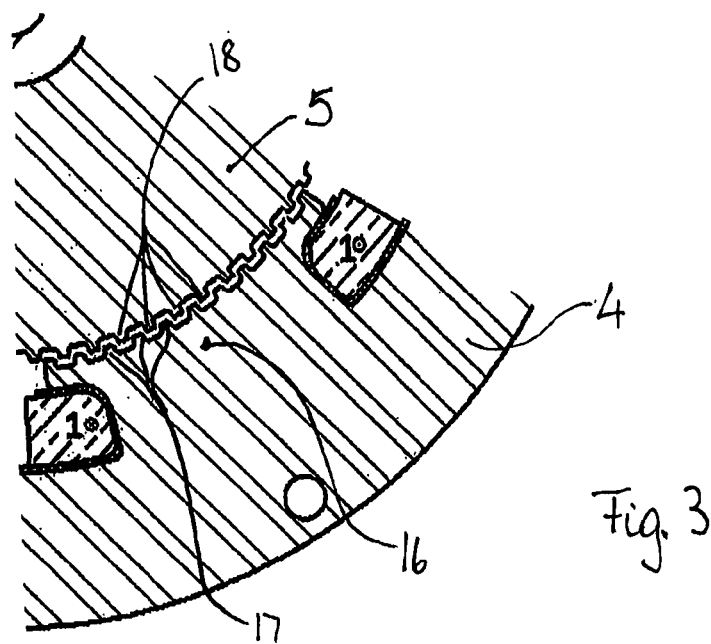
Fig. 2
Fig. 3

THREE PHASED BALANCED OR UNBALANCED ASYMMETRIC RELUCTANCE MOTOR

CROSS REFERENCE TO RELATED APPLICATIONS

The present application is a National Stage of International Application No. PCT/N02012/050013 filed on Feb. 2, 2012, which claims the benefit of Norwegian Patent Application No. 20110191 filed on Feb. 3, 2011. The entire disclosures of which are incorporated herein by reference.

TECHNICAL FIELD OF THE INVENTION

The present invention relates to a three phased reluctance motor, comprising a rotor arranged to rotate on a shaft and a stator in the form of an annulus, the stator being provided with a plurality of coils, and where both the exterior surface of the rotor and the interior surface of the coils are provided with a number of teeth. Both a balanced and unbalanced variant of the motor are presented. For the balanced variant there is no net electromagnetic force which must be absorbed by the bearings, while for the unbalanced variant there is a considerable net electromagnetic force which must be absorbed by the bearings. The unbalanced variant can, however, produce more torque.

BACKGROUND FOR THE INVENTION

In many applications there are a need for an electric motor which most of the time is turned off. A typical example is a motor for opening and closing a valve. For such a motors low price and descent torque density are important. Efficiency is generally of little importance because the motor is seldom in operation and the energy cost is therefore low anyway.

The expensive parts in a motor are permanent magnets and copper coils. Electric steel has in comparison a low price. When optimizing on price it is therefore preferable to increase torque by increasing amount of electric steel. Moreover, to reduce the amount of copper in a motor, it is important to keep in mind that the amount of flux through a coil is dependent on the area inside the coil. The coil should therefore be as close to circular and have as long circumference as possible to utilize the current to the max. The parts for motor must be easy to manufacture with a minimum of strict tolerances and the motor most be easy to assemble. Here the reluctance motor has the advantage since there is no forces between rotor and stator unless there go current through the coils.

In the power supply the power transistors are a relative expensive part, so it is preferably to have as few bridges as possible. In a reluctance motor it generally makes no difference which way the current goes in the coil. This is interesting because the bridge which supplies the phase with current then can consist of one transistor instead of four.

From Wikipedia™ (Enclosure 1), a four-phase stepper motor is disclosed, the motor being a brushless, synchronous electric motor that can divide a full rotation into a large number of steps. Stepper motors operate differently from DC brush motors, which rotate when voltage is applied to their terminals. Stepper motors, on the other hand, effectively have multiple "toothed" electromagnets arranged around a central gear-shaped piece of iron. The electromagnets are energized by an external control circuit, such as a microcontroller. To make the motor shaft turn, first one electromagnet is given power, which makes the gear's teeth magnetically attracted to the electromagnet's teeth. When the gear's teeth are thus aligned to the first electromagnet, they are slightly offset from the next electromagnet. When the next electromagnet is turned on and the first is turned off, the gear rotates slightly to align with the next one, and from there the process is repeated for then four phases. Each of those slight rotations is called a "step", with an integer number of steps making a full rotation. In such way, the motor can be turned by a precise angle.

The step motor disclosed may either be a unipolar or a bipolar motor. Stepper motors operate differently from DC brush motors, which rotate when voltage is applied to their terminals.

Enclosure 2 discloses a hybrid stepper motor where permanent magnets are used.

The invention is motivated by the need of an electric motor which has low price, descent torque and low rotation speed, preferable with characteristics of a stepper motor.

SUMMARY OF THE INVENTION

The present invention relates to a reluctance motor where torque is created between a relative large number of teeth in stator and rotor. Because of the high number of teeth the rotor will rotate at low speed compared to the electric frequency. Since the teeth in the motors stator are shifted in an asymmetric pattern, it is only necessary with six coils to create positive torque at all rotor positions. The coils are connected in pairs so the motor are three-phased. The design is so that the current in each of the three wires, one for each phase, only need to vary between zero and positive. Three wire ends can therefore be grounded inside the machine, reducing the number of wires out of the machine to four.

An object of the invention is to provide an electric motor which has low price, produces a decent torque and has the characteristics of a stepper motor, which can compete with the two phased hybrid stepper motors which has most of this marked segment today.

Another object of the invention is to achieve a more compact shape of the rotor and the stator teeth in order to achieve a more effective use of a three-phase reluctance motor.

The objects of the present invention are achieved by means of an asymmetrical reluctance motor as further defined by the independent claims, while embodiments or alternatives of such motor are defined by the dependent claims. According to the present invention, the slot between of at least two consecutive coils may be different from the neighbouring slot between two consecutive coils.

According to one main embodiment of the invention, the three-phase balanced reluctance motor has a stator provided with six slots for three pairs of coils in stator and that there is a number of teeth in rotor, denoted nTeeth, such number being equal to n*6 where n is a positive integer equal to or larger than three, and that the angle from centre of first slot for coil 1 and 2 in stator to centre of first tooth is 360°/nTeeth and that then there is ((nTeeth/6)−1) teeth with an angle of 360°/nTeeth between each tooth before there is a second slot for coil 1 and 3 where the angle between the teeth on each side of the slot is (7/3)*360°/nTeeth, and that then there is (nTeeth/6−1) teeth with an angle of 360°/nTeeth between each tooth before there is a third slot for coil 2 and 3 where the angle between the teeth on each side of the slot is (4/3)*360°/nTeeth, and that there is ((nTeeth/6)−1) teeth with an angle of 360°/nTeeth between each tooth before there is a forth slot for coil 1 and 2 where the angle between the last tooth and the centre of the slot is (4/3)*360°/nTeeth, and that then the pattern from centre of first slot to centre of forth slot is repeated once to complete the full circle.

According to another main embodiment of the invention, the three-phase unbalanced reluctance motor has six slots for three pairs of coils in the stator, the stator having a number of teeth in rotor, denoted nTeeth, which is equal to n*6 where n is a positive integer equal to or larger than three. The angle from centre of the first slot only for coil 1 in the stator to the first tooth is 360°/nTeeth and that there is (nTeeth/6−1) teeth with an angle of 360°/nTeeth between each tooth before there is a second slot for coil 1 and 2 where the angle between the teeth on each side of the slot is (7/3)*360°/nTeeth, and that then there is ((nTeeth/6)−1) teeth with an angle of 360°/nTeeth between each tooth before there is a third slot only for coil 2 where the angle between the teeth on each side of the slot is 2*360°/nTeeth, and that then there is ((nTeeth/6)−1) teeth with an angle of 360°/nTeeth between each tooth before there is a forth slot for coil 2 and 3 where the angle between the last tooth and the centre of the slot is (2/3)*360°/nTeeth, and that then the pattern from centre of first slot to centre of forth slot is mirrored through the plane through the rotation axis and centre of first/forth slot to complete the full circle.

According to an embodiment of said two variants of the three-phase reluctance motor, all the variants which occurs if any of the sided in the motor is mirrored through the planes through the centre axis and the centre of the slots for coils.

Some of the stator teeth may be moved slightly out of the position described here to archive a skewing effect, and there may be an additional tooth in the slots which is big enough for it. Also some of the teeth can be removed from the described geometry without altering the motor principle. Further, the slots for the coils may be placed slightly irregular compared to the geometry according to the two main embodiments described above, e.g. to reduce saturation in the iron behind the teeth close to the slots.

SHORT DESCRIPTION OF THE DRAWINGS

One embodiment of the invention will be described in further details below, referring to the drawings where:

FIG. 2 shows schematically a cross section through the stator and rotor of the balanced variant of the described invention, the cross section being perpendicular to the axis of rotation of the motor;

FIG. 3 shows in an enlarged scale a cross section through one sector of the cross section shown in FIG. 2.

DETAILED DESCRIPTION OF THE INVENTION

Figure 1:
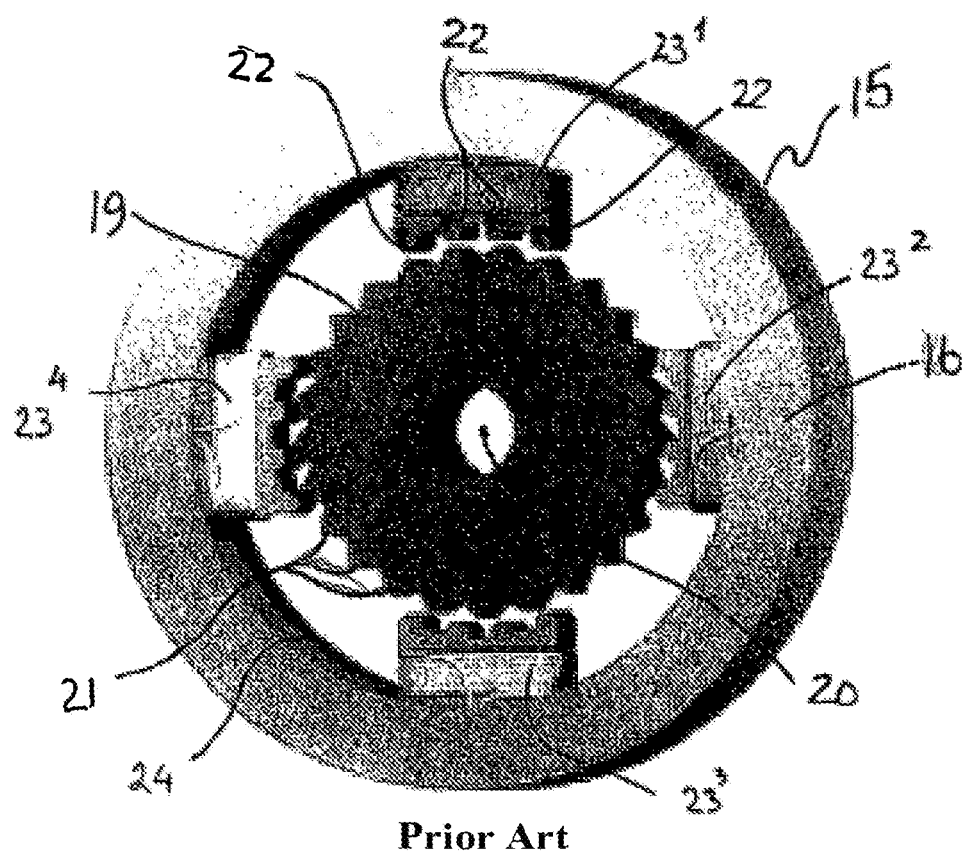
FIG. 1 shows schematically in perspective, the construction and the various major parts of a prior art synchronous step motor.

FIG. 1 shows schematically in perspective a prior art synchronous step motor 15, equipped with an annulus 16, provided with four electromagnets $23^{1-4}$, arranged in equal distance apart on the inner surface 24 of the annulus 16. Each electromagnet $23^{1-4}$ is further provided with four teeth 22 on the surface facing the rotor 19. The magnets $23^{1-4}$ may be successively energized, the energizing being controlled by an external control circuit (not shown). Further, the step motor 15 is provided with a centrally arranged iron rotor 19, provided with a centrally arranged bore 20 for a shaft (not shown). The iron rotor 19 is gear-shaped, provided with a large number of teeth 21. In order to initiate rotation of the rotor 19, the top electromagnet $23^1$ is turned on, attracting the nearest tooth 21 of the gear-shaped rotor 19, the nearest tooth being marked with A in the Figure, such movement being the first step of the rotation. With the teeth 21 aligned to the electromagnet $23^1$, they will be slightly offset from the electromagnet $23^2$. The top magnet $23^1$ is then turned off and the right electromagnet, i.e. electromagnet $23^2$, is energized, pulling the nearest teeth 21 slightly to the right. This results in a second step of rotation of 3.6° according to the prior art embodiment shown in FIG. 1. The bottom electromagnet $23^3$ is energized while electromagnet $23^2$ is de-energized, producing another 3.6° step of rotation of the rotor 19. The left electromagnet, i.e. electromagnet $23^4$, is then energized, while electromagnet $23^3$ is de-energized, enabling the rotor 19 to be rotated by 3.6°. When the top magnet $23^1$ is energized once more, the teeth in the sprocket 19 will have rotated by one tooth position. Since there are twenty-five teeth, it will take hundred steps to make a full rotation of the iron sprocket 19 in this example.

FIG. 2 shows a cross section of a plane perpendicular to the axis of rotation of the motor 10 according to the present invention. The cross section shown is equal through the entire electromagnetically active part of the motor 10. The motor 10 comprises a stator 4 consisting of stator iron, coil pairs 1,2,3 and coil liner 7. The coil liner 7 is strictly speaking not necessary, but it protects the wire insulation from the electrical sheet steel which tends to have sharp edges. Further, the motor 10 comprises a rotor 5 consisting of rotor iron which is pressed or glued on the shaft 8. The shaft 8 is there to transfer the torque mechanically to the device the motor shall influence. Further, the stator 4 is provided with holes 6, configured for bolting the stator 4 to a frame or the like (not shown).

The stator 4 and rotor 5 is made up of a stack of sheets of electric steel with thin layers of insulation between them. These motor elements 4,5 could also be made of solid iron or pressed powder iron but such embodiment would be more expensive and give less performance.

Figure 4:
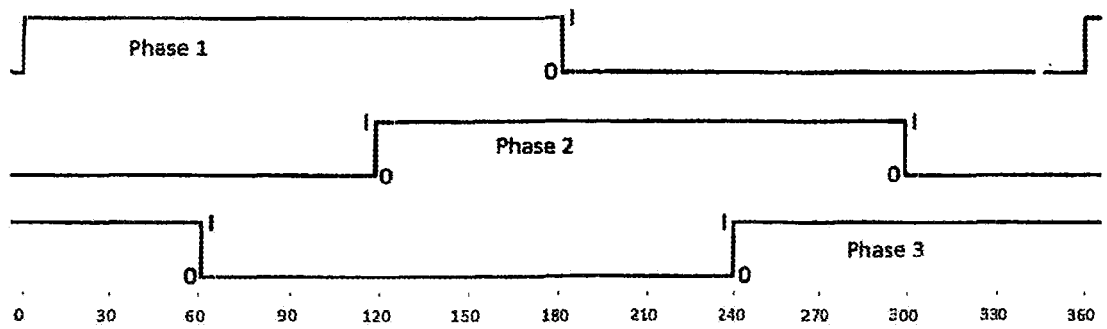
FIG. 4 shows current in phases as function of electric angle, square wave on or off, the electric angle being equal to mechanical angle*nTeeth, where n is the number of teeth on the rotor.

The pair of coils 1,2,3 are arranged is three phases, i.e. phase 1, phase 2, and phase 3 for the numbering to be consistent with FIG. 2. The symbols ⊗ ⊙ shown in the FIG. 2 indicate if current go into or out of the cross section plane of Figure. It only goes current in one or two of the phases at any given time. The current in the three-phases has a shape as shown in FIG. 4. Considerable modifications from the square wave shape indicated are possible depending on how the motor is optimized. To optimize the motor power a sinusoidal current shape is likely to be optimal. If constant torque at low speed is required a complex curve which would resemble the letter M is likely to be optimal.

Assuming counter clockwise direction of rotation of the rotor 5, phase 2 in FIG. 2 has full current, the current in phase 1 is about to be turned on while the current in phase 3 will be off until the motor has moved another 120°.

The motor will not work unless the asymmetric geometry is correct.

There are six coils in the stator 4, each being wound around a big tooth 16. As indicated in FIG. 3, each big tooth 16 shall have the same number of small teeth 17, meaning that the total number of small teeth 18 in rotor 5 most be a power of 6. It is necessary to remove six small teeth 17 in stator 4 to make the geometry fit. It is possible to not remove four of these six teeth with the possible benefit of a reduced amount of copper in two of the phases. It is also possible to deviate from the requirement of an equal number of small teeth on each of the six big teeth 16 in stator, but this is likely to cause increased torque ripple and make the motor slightly unbalanced. Both options give considerable design complications.

Regarding the number of teeth, it makes little sense of having only one small tooth on each big stator tooth 16, so the smallest power is 3. The number of teeth in rotor must then be nTeeth=n*6, n=3,4,5 . . . . Higher number of teeth will give higher torque because the motor can utilize a larger percentage of the air gap circumference, at least until the number of teeth becomes so high that a considerable amount of flux leaks to rotor through paths which does not create torque.

Reference is made to the embodiment shown in FIG. 2. Based on the various formulas defined above the various number of teeth and angles will be identified, the relevant corresponding formulae being given in brackets. With reference to FIG. 2, the angle a between the centre of two rotor teeth 13 is a=360°/nTeeth. Since the number n of teeth according to the embodiment shown in FIG. 2 is equal 72 (nTeeth=72), the angle a=5°, as also indicated in the FIG. 2. The angle b from the centre of the slot $15^1$ for coil 1 and 2 in FIG. 2 to centre of first stator tooth 9 is angle b=360°/nTeeth. Hence, according to the embodiment disclosed, such angle is b=5°, since shown number n of teeth on rotor is 72. It is thus eleven teeth ((nTeeth/6)−1), encircled by coil 1 in counter clockwise direction in FIG. 2 from slot $15^1$ to slot $15^2$ for coil 1 and 3. The angle between centre of last tooth 10 encircled by coil 1 and first tooth 11 encircled by coil 3 is the angle b+d where b=5° (360°/72) and d=6.67° [(4/3)*360°/72], i.e. the angle b+d=11,67° according to the embodiment shown in FIG. 2. It is then eleven teeth ((72/6)−1) between the centre of each tooth encircled by coil 3 between the slot $15^2$ and the slot $15^3$ for coil 2 and 3. The angle between the teeth 12,13 on each side of the slot $15^3$ for coil 2 and 3 is 2*c, where c=(2/3)*360°/nTeeth, i.e. c=6.67° according to the embodiment shown in FIG. 2. It is then ((nTeeth/6)−1) with 360°/nTeeth between centre of each tooth encircled by coil 2. The angle from last tooth 14 encircled by coil 2 to centre of slot $15^4$ for coil 1 and 2 is then d=(4/3)*360°/nTeeth before the pattern is repeated, with slot $15^4$ as the first slot in the next sequence. The number of total teeth on the rotor 5 according to the embodiment shown in FIG. 2 is nTeeth=6*12=72.

The advantage of this design over other designs is that the attracting forces between stator and rotor is balanced because the linked coils are opposite of each other. This reduces the forces on the bearings. If rotor is perfectly centred the forces on the bearings would be zero.

The disadvantage is that the magnetic field from all the phases go through the entire machine and therefore interacts with each other. As a result the back iron in stator 4 is rather thick because magnetic field from two phases has to pass through it. This reduces the torque because it reduces rotor radius. It also makes it more difficult to run the motor "smoothly" with sensor free control. With "smoothly" means that the rotor does not start and stop at every step as it would if the speed was controlled simply by switching the current to the phases as shown in FIG. 4 at a given frequency.

In the unbalanced variant of this motor there is an angle of 360°/nTeeth from centre of first slot $15^1$ to centre first tooth. Then there are (nTeeth/6−1) teeth with 360°/nTeeth between centres of each tooth before there is a second slot $15^2$. The angle between centres of the teeth on each side of the second slot $15^2$ is (7/3)*360°/nTeeth. Then there are (nTeeth/6−1) teeth with 360°/nTeeth between centres of each tooth before there is a third slot $15^3$. The angle between the teeth on each side of the third slot $15^3$ is 2*360°/nTeeth. Then there are (nTeeth/6−1) teeth with 360°/nTeeth between centre of each tooth before the forth slot $15^4$. The angle between centres of the last tooth and the centre of the forth slot $15^4$ is (2/3)*360°/nTeeth. The stator 4 is then mirrored through the plane through the rotation axes and centre of first/forth slot $15^1$,$15^4$. Compared to the motor shown in FIG. 2 the first slot $15^1$ in this motor will only contain coils from phase 1, the second slot $15^2$ will contain coils from phase 1 and 2, the third slot $15^3$ will only contain coils from phase 2, the forth slot $15^4$ will contain coils from phase 2 and 3, the fifth slot $15^5$ will only contain coils from phase 3 and the sixth slot $15^6$ will contain coils from phase 1 and 3.

Torque is larger for the unbalanced machine and it is easier to run the motor "smoothly", but the bearings must handle a huge torque.

Enclosures:
(1) Wikipedia—Stepper Motor, pages 1-8, print out 18.01.2011
(2) Web-Books—Stepper Motors, page 1-10, print out 18.01.2011

The invention claimed is:

1. A three phased balanced asymmetric reluctance motor comprising:
a rotor rotatably arranged on a shaft, wherein an exterior surface of the rotor has a number of rotor teeth, hereafter denoted nTeeth, equal to n*6 wherein n is a positive integer equal to or larger than three; and
a stator in the form of an annulus provided with first through sixth slots for coils and provided with a plurality of coils, wherein a plurality of big stator teeth are provided on an interior surface of the stator, and wherein each of the plurality of big stator teeth contain an equal number of small stator teeth,
wherein the first slot of the stator receives a first coil and a second coil, the second slot of the stator receives the first coil and a third coil, the third slot of the stator receives the second coil and the third coil, and the fourth slot of the stator receives the first coil and the second coil;
wherein the equal number of the small stator teeth provided on each of the plurality of big stator teeth is equal to (nTeeth/6)−1,
wherein an angle (a), as measured from a center of the rotor, and formed between a center of a first rotor tooth and a center of a second rotor tooth is equal to 360°/nTeeth, wherein the first rotor tooth and the second rotor tooth are consecutively positioned,
wherein an angle (b), measured from the center of the rotor, and formed between a center of the first slot opening of the stator and a center of a first small stator tooth is equal to 360°/nTeeth,
wherein an angle (d), as measured from the center of the rotor, and formed between the center of the first slot opening of the stator and a center of a last small stator tooth is equal to (4/3)*360°/nTeeth,
wherein an angle (b+d), as measured from the center of the rotor, and formed between the first small stator tooth and the last small stator tooth is equal to (7/3)*360°/nTeeth,
wherein a width of the first slot opening of the stator is equal to a width of the second slot opening of the stator, wherein an angle (c), as measured from the center of the rotor, and formed between a center of a third slot opening for the stator and a center of a small stator tooth adjacent to the third slot opening of the stator is equal to (2/3)*360°/nTeeth, wherein a pattern from the center of the first slot opening to the center of the fourth slot opening is repeated around a complete circumference of the stator, the fourth slot opening being the first slot opening in the next sequence.

2. The three phased reluctance motor according to claim 1, wherein a variant in the three phased balanced asymmetric reluctance motor is mirrored through a center axis and through the center of the slots for the coils.

3. The three phased reluctance motor according to claim 1, wherein at least one of the stator teeth is positioned to achieve a skewing effect.

4. The three phased reluctance motor according to claim 1, wherein there is an additional tooth in the slots which are big enough for the additional tooth.

* * * * *